(12) United States Patent
Lenkey (10) Patent No.: US 9,889,940 B2
(45) Date of Patent: Feb. 13, 2018

(54) DEICING APPARATUSES COMPRISING AT LEAST ONE STANDOFF

(71) Applicant: Peter Lenkey, Culver City, CA (US)

(72) Inventor: Peter Lenkey, Culver City, CA (US)

( * ) Notice: Subject to any disclaimer, the term of this patent is extended or adjusted under 35 U.S.C. 154(b) by 0 days.

(21) Appl. No.: 15/434,288

(22) Filed: Feb. 16, 2017

(65) Prior Publication Data

US 2017/0233085 A1 Aug. 17, 2017

Related U.S. Application Data

(60) Provisional application No. 62/296,053, filed on Feb. 16, 2016.

(51) Int. Cl.
*B64D 15/16* (2006.01)
*B64D 33/02* (2006.01)

(52) U.S. Cl.
CPC ........... *B64D 15/163* (2013.01); *B64D 15/16* (2013.01); *B64D 33/02* (2013.01); *B64D 2033/0233* (2013.01)

(58) Field of Classification Search
CPC ............ B64D 2033/0233; B64D 15/16; B64D 15/163; B64D 15/00
USPC .............................. 244/134 D, 134 A, 134 R
See application file for complete search history.

(56) References Cited

U.S. PATENT DOCUMENTS

| | | | |
|---|---|---|---|
| 4,399,967 A * | 8/1983 | Sandorff | B64D 15/163 244/134 R |
| 4,678,144 A | 7/1987 | Goehner et al. | |
| 4,690,353 A | 9/1987 | Haslim | |
| 4,875,644 A | 10/1989 | Adams et al. | |
| 4,894,569 A | 1/1990 | Lardiere et al. | |
| 4,982,121 A | 1/1991 | Lardiere et al. | |
| 5,022,612 A | 6/1991 | Berson | |
| 5,074,497 A | 12/1991 | Phillips, II | |
| 5,107,154 A | 4/1992 | Goldberg et al. | |
| 5,129,598 A | 7/1992 | Adam et al. | |
| 5,142,767 A | 9/1992 | Adams | |
| 5,143,325 A | 9/1992 | Zieve et al. | |
| 5,152,480 A | 10/1992 | Adams et al. | |
| 5,248,116 A | 9/1993 | Rauckhorst | |
| 5,272,400 A | 12/1993 | Goldberg et al. | |
| 5,288,355 A | 2/1994 | Leffel et al. | |
| 5,314,145 A | 5/1994 | Rauckhorst, III | |
| 5,326,051 A | 7/1994 | Pisarski | |
| 5,346,160 A | 9/1994 | Pisarski | |

(Continued)

OTHER PUBLICATIONS

Wright, Tim; Electro-mechanical Deicing: Ice kills. That's why engineers continue to invent new ways to keep it off airplane wings; Air & Space Magazine; Mar. 2004; <http://www.airspacemag.com/how-things-work/electro-mechanical-deicing-666040/>.*

(Continued)

*Primary Examiner* — Tien Q Dinh
*Assistant Examiner* — Michael A. Fabula (57) ABSTRACT

Apparatuses for and methods of deicing aircraft surfaces, engine inlets, windmill blades and other structures. Deicing apparatuses can comprise at least one standoff coupled with an actuator and a first region of an inner surface of a skin. A standoff can act as a moment arm and can create efficient, tailorable skin bending and acceleration, breaking an ice to skin bond. Integral as well as modular leading edges can comprise deicing apparatuses.

5 Claims, 11 Drawing Sheets

(56) References Cited

U.S. PATENT DOCUMENTS

| | | |
|---|---|---|
| 5,429,327 A | 7/1995 | Adams |
| 5,544,845 A | 8/1996 | Giamati et al. |
| 5,547,150 A | 8/1996 | Adams et al. |
| 5,553,814 A | 9/1996 | Rauckhorst, III et al. |
| 5,553,815 A | 9/1996 | Adams et al. |
| 5,584,450 A | 12/1996 | Pisarski |
| 5,609,314 A * | 3/1997 | Rauckhorst, III ..... B64D 15/16 244/134 A |
| 5,657,952 A | 8/1997 | Goldberg |
| 5,686,003 A | 11/1997 | Ingram |
| 5,782,435 A | 7/1998 | Ingram |
| 5,904,322 A * | 5/1999 | Giamati ............... B64D 15/166 244/134 B |
| 5,921,502 A | 7/1999 | Al-Khalil |
| 6,102,333 A | 8/2000 | Gerardi |
| 6,196,500 B1 | 3/2001 | Al-Khalil |
| 6,207,939 B1 | 3/2001 | Allaire |
| 6,283,411 B1 | 9/2001 | Giamati et al. |
| RE38,024 E | 3/2003 | Adams |
| 6,684,647 B2 | 2/2004 | Petrenko |
| 6,870,139 B2 | 3/2005 | Petrenko |
| 7,087,876 B2 | 8/2006 | Petrenko |
| 7,164,100 B2 | 1/2007 | Petrenko |
| 9,108,735 B2 | 8/2015 | Olsen et al. |
| 2010/0288882 A1* | 11/2010 | Olson ................. B64D 15/163 244/134 D |
| 2013/0228653 A1* | 9/2013 | Breer .................... B64D 15/12 244/134 D |
| 2014/0191082 A1* | 7/2014 | Figueroa-Karlstrom ........... B64D 15/163 244/134 A |
| 2014/0252172 A1* | 9/2014 | Bridgeford ......... B64D 15/163 244/134 A |
| 2015/0183530 A1* | 7/2015 | Strobl ................. H01L 41/313 29/428 |

OTHER PUBLICATIONS

Zumwalt et al.; Designing an Electro-Impulse De-Icing System; AIAA; AIAA 24th Aerospace Sciences Meeting; Jan. 6-9, 1986.*

* cited by examiner

DEICING APPARATUSES COMPRISING AT LEAST ONE STANDOFF

The present application herein incorporates by reference in its entirety U.S. Provisional Application No. 62/296,053, file date Feb. 16, 2016.

FIELD

The present disclosure is directed generally to efficient, highly tailorable aircraft deicing apparatuses, and associated systems and methods of manufacture. The system may be used to de-ice leading edges of aircraft wings, leading edges of engine inlets, aircraft control surfaces as well as other aircraft surfaces and components.

BACKGROUND

Ice accretion on aircraft in flight can lead to hazardous and sometimes deadly results. Many approaches to solving the problem of aircraft ice accretion have been tried. Among the approaches are: 1) Expanding Bladders; 2) Heating; 3) Ethylene Glycol Bathing; and 4) Electro-expulsive De-icing systems (EEDS).

An EEDS taught by U.S. Pat. No. 9,108,735 discloses a system comprising an inner shell nested inside an outer shell. The system requires expensive tooling to manufacture the inner shell, resulting in long lead times for manufacturing of the required tooling. The installation of the system has "blind bonds" which are time consuming, risky and difficult to achieve. The system includes a frictional design detail as the inner shell is required to rub on the outer shell. As the system is typically expected to fire more than 100,000 times during a typical aircraft lifetime, the rubbing could easily "sand" the skin, resulting in leading edge structural failure. The system imparts actuation forces on the skin which are generally perpendicular to the local skin tangent. These actuation forces result in an extremely loud short, sharp, shock noise, which minimizes or excludes the system/aircraft from being used when covert operations are required.

The system transfers the actuation force to the bottom surface through the deformation of the inner shell. The required deformation of the inner shell saps a significant amount of the actuation force. Consequently, the amount of actuation force required to remove ice is greater. The system is limited in its ability to provide a design that can deliver an actuator force to a specific area of a leading edge which may be accreting ice.

The prior art system typically requires a leading edge skin ply layup modification in order to adequately deice the leading edge. Aircraft manufacturers are typically not enthusiastic about modifying the leading edge as this requires significant amount of retesting and requalification of the aircraft.

SUMMARY

The leading edge in-flight de-icing apparatus of the disclosure comprises at least one standoff and at least one actuator. An actuator is comprised of at least two conductors. One of the conductors can be coupled with the skin at a first region. The other conductor can be coupled with an end of a standoff. The opposite end of the standoff can be coupled with the skin at a second region. The deicing control system sends a large current pulse through the actuator. The current passing through the actuator creates forces in each of the conductors. The conductor forces are communicated to the skin causing the skin to bend and accelerate, shedding the ice. A leading edge may be a modular unit or integral with the leading edge support structure.

DETAILED DESCRIPTION

The present disclosure is directed generally to efficient, highly tailorable aircraft deicing apparatuses, and associated systems and methods of manufacture. Several details describing structures and/or processes that are well-known and often associated with aircraft deicing systems are not set forth in the following description to avoid unnecessarily obscuring the description of the various embodiments of the disclosure. Moreover, although the following disclosure sets forth several embodiments, several other embodiments can have different configurations or different components than those described in this section. In particular, other embodiments may have additional elements or may lack one or more of the elements described below with reference to the Figures. Many of the elements included in the following Figures are not drawn to scale for purposes of clarity and/or illustration. In this disclosure, the term "leading edge" comprises both leading edges of flight surfaces (wings, horizontal stabilizers, vertical stabilizers, elevons, etc . . . ) as well as leading edges of engine inlets.

The present disclosure solves many of the above mentioned problems with the prior art and provides a distinct advance in the art of aircraft de-icing. An embodiment of the present disclosure comprises a first actuator coupled with a skin of an aircraft. A first actuator can be positioned at almost any location on a skin. Additionally, a second actuator can be coupled with an end of a standoff. A standoff opposing end can also be coupled with the skin. A standoff can be coupled with a skin in such a fashion as to position a second actuator proximate with a first actuator. During actuation, a large current pulse is passed through the actuators resulting in opposing forces being exerted on the actuators, driving them apart. A force exerted on the first actuator can be directed radially outward from the skin, resulting in large accelerations of the ice, radially away from the leading edge, successfully de-icing a leading. The force on the second actuator is communicated to the skin through the standoff. The actuator force can impart forces and moments to the skin, creating, accelerations and strains in the skin and ice, successfully de-icing the surface.

The potential embodiment does not require significant amount of expensive tooling. In some embodiments, a standoff can be cut from an off the shelf honeycomb sandwich panel. In some embodiments, simple angle brackets could be utilized to couple a standoff to a skin. Angle brackets could be inexpensively and quickly manufactured using one-sided tooling. Installation of a standoff, angle brackets and actuators can be accomplished without any blind bonds, resulting in high quality bonds and excellent alignment of first and second actuators. No frictional forces are applied to the wing skin providing a much safer design than prior art frictional designs.

The ability of a system to impart moments to a skin provides a tool which can shed ice in some situations where direct acceleration would be prohibitive. One such situation would be a requirement of a noise produced during actuation was soft enough to allow covert operation of an aircraft while de-icing. De-icing systems which create lower direct acceleration would provide ice shedding with significantly less noise, allowing de-icing of an aircraft during covert operations.

The apparatus is efficient, transferring virtually all actuation energy into a skin to de-ice. The system is highly tailorable as actuators and standoffs can be coupled with a skin at almost any position.

In a further embodiment, a de-icing system can comprise two standoffs. A first standoff can be coupled with a first conductor and a second standoff can be coupled with a second conductor. An embodiment utilizing two standoffs could include standoffs being aligned parallel with each other but offset from one another wherein conductors could be mounted between standoffs. Actuation forces in this embodiment would be oriented perpendicular to the standoffs. This embodiment could produce a large moment in a skin and small direct accelerations. This embodiment would produce significantly less noise than other configurations in which actuator forces are oriented in a direction which produces large outward accelerations in a skin.

Embodiments in which an actuator force vector is oriented perpendicular to a standoff could produce extreme strain levels in a skin. These embodiments could require significantly less power to produce strain levels high enough to de-ice a surface. Lower power requirements would mean a more efficient system, demanding less power from an aircraft. In the case of UAV's, this would mean a longer time in the air and greater asset utilization.

Further embodiments can comprise an additional standoff. An additional standoff can also be utilized to transfer part of an actuation force to a third location in a skin. In these embodiments, a second standoff could be positioned proximate to a first standoff. An actuation force could deflect a first standoff driving it into a second standoff, creating an impact between first and second standoffs. A second standoff, coupled with a skin, could communicate the impact force to a third location on a surface.

In yet a further embodiment, a third standoff could be utilized to transfer a portion of an actuator force to a third skin location as well as limit a deflection of another standoff by acting as a stop. Embodiments in which a second standoff has a large deflection, a third standoff could additionally serve to limit a travel of a standoff which is contacting it as well as communicate an impact force occurring as a result of contact between second and third standoffs to a skin.

Figure 1A:
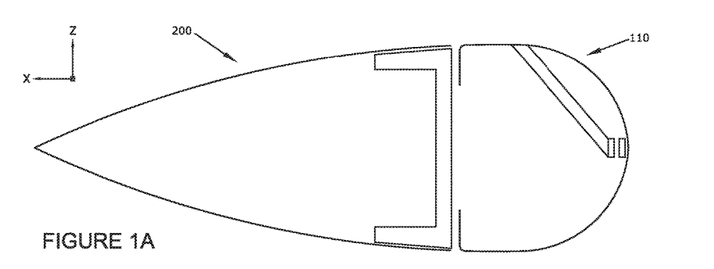
FIG. 1A is a partially schematic, profile illustration of an airfoil comprising an EEDS and a modular leading edge in accordance with an embodiment of the disclosure.

FIG. 1A is a partially schematic, profile illustration of an airfoil comprising an EEDS and a modular leading edge (110) in accordance with an embodiment of the disclosure. Modular leading edge (110) can be coupled with wing box (200). Modular leading edges can comprise flanges which can be coupled with a forward face of wing box (200). Modular leading edge (110) is shown moved forward from forward face of wing box (200) for clarity. In some embodiments, inward bending flanges can be bonded directly to a forward face of wing box (200).

Figure 1B:
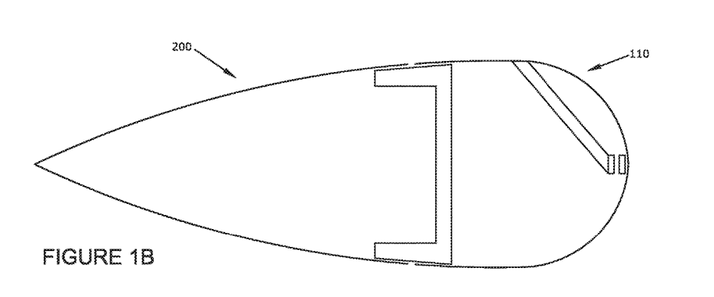
FIG. 1B is a partially schematic, profile illustration of an airfoil comprising an EEDS and a modular leading edge in accordance with an embodiment of the disclosure.

FIG. 1B is a partially schematic, profile illustration of an airfoil comprising an EEDS and a modular leading edge (110) in accordance with an embodiment of the disclosure. Modular leading edge (110) can be coupled with an upper and lower surface of wing box (200). Additionally, modular leading edge (110) can be coupled with wing box (200) with a combination of connections with upper and lower surfaces an simultaneously coupled with the forward face of wing box (200).

Figure 1C:
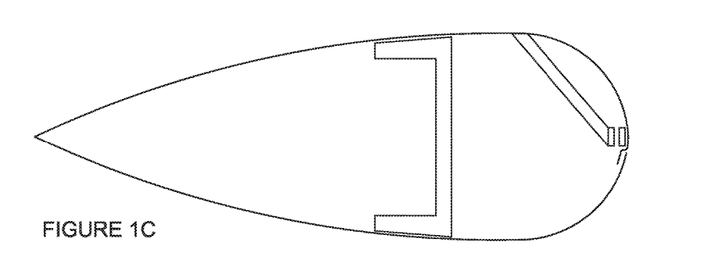
FIG. 1C is a partially schematic, profile illustration of an airfoil comprising an EEDS and an integral leading edge in accordance with an embodiment of the disclosure.

FIG. 1C is a partially schematic, profile illustration of an airfoil comprising an EEDS and an integral leading edge in accordance with an embodiment of the disclosure. Some airfoils can be constructed with an upper and lower skin which can be continuous from a trailing edge to a 0% chord location. Leading edges in surfaces constructed with continuous skin can be referred to as integral leading edges. Integral leading edges can comprise EEDS systems.

Figure 2:
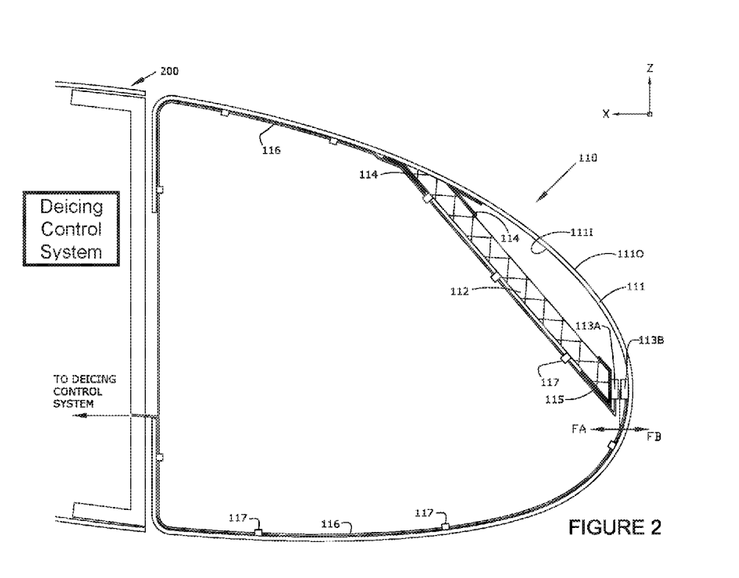
FIG. 2 is an enlarged partially schematic, profile illustration of a portion of an airfoil comprising an EEDS system and a modular leading edge in accordance with an embodiment of the disclosure.

FIG. 2 is an enlarged partially schematic, profile Illustration of a portion of an airfoil comprising an EEDS system and a modular leading edge (110) in accordance with an embodiment of the disclosure. An EEDS system comprises a standoff (112) and an actuator comprising conductors (113A) and (113B). An EEDS system can produce and send large current pulses through conductors (113A) and (113B). In some embodiments, a current pulse in (113B) is in an opposite direction as a current pulse in (113A), resulting in a force (FB) being applied to conductor (113B) which is generally opposite to force (FA) applied to conductor (113A). Conductor (113B) can be coupled with skin (111) and can communicate force (FB) to skin (111). Skin (111) can comprise skin inner surface (111I) and skin outer surface (111O). A FIG. 2 embodiment, force (FB) could result in acceleration radially outward of skin (111) proximate with conductor (113B). Force (FA) can be communicated to skin (111) through standoff (112), resulting in forces and moments being applied to skin (111) in a region where standoff (12) is couplet with skin (111). Standoff (112) can be cut from off the shelf honeycomb sandwich panels which are inexpensive and readily available from many manufacturers. Coupling of standoff (112) with skin (111) can comprise angle brackets (114). Angle brackets (114) can be fabricated on inexpensive, single sided tooling. Simple low cost components allow a designer to create and/or modify a design, without significant additional cost or schedule. Standoff (112) can comprise standoff closeout (115). Prior art designs comprising inner shells require significant additional expense and time to fabricate required tooling for an initial design. If a design does not successfully deice a surface, a design change would cause significant amount of additional expense as well as schedule slippage. In addition, it is routine to perform expensive de-icing wind tunnel testing to validate a design. One such facility is the NASA Glenn Icing Research Tunnel (IRT) in Cleveland, Ohio. IRT testing is routinely performed once a design has been selected. If a designer wanted to test more than one design of an EEDS system during a single tunnel entry, there would be significant amount of additional cost and schedule to produce the additional tooling required to implement a second or third design. The additional tooling costs to create an additional inner shell could easily be in excess of $100,000 per additional design. With the instant design approach, the cost of testing more than one design is so low, several designs could be wind tunnel tested during a single tunnel entry, providing valuable additional data to be used in selecting a final design.

Figure 3:
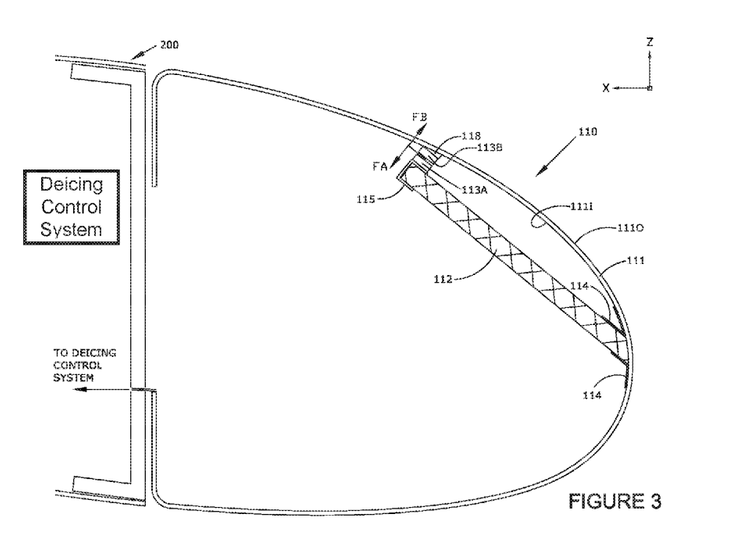
FIG. 3 is an enlarged partially schematic, profile illustration of a portion of an airfoil comprising an EEDS and a modular leading edge in accordance with a further embodiment of the disclosure.

FIG. 3 is an enlarged partially schematic, profile illustration of a portion of an airfoil comprising an EEDS and a modular leading edge in accordance with a further embodiment of the disclosure. This embodiment is somewhat reversed from that illustrated in FIG. 2, providing an example of design flexibility. In this disclosure, the term upper skin comprises that portion of skin (111) on an upper surface of an airfoil, generally extending between a 0% chord location and a trailing edge. Conversely, the term "lower skin" would comprise the lower skin extending between a 0% chord location and a trailing edge. Conductor (113B) can be coupled with skin (111) at any region. FIG. 3 illustrates conductor (113B) coupled with skin (111) at a first region. A coupling of conductor (113B) with skin (111) can comprise an alignment wedge (118). Alignment wedge (118) could orient conductor (113B), and actuation force (FB), to impact skin (110) in a direction to achieve enhanced de-icing as well as align and locate conductor (113B) proximate with conductor (113A). Conductor (113A) can be coupled with standoff (112). Actuation force (FA) can be communicated to skin (111) through standoff (112). Actuator force (FA) can produce forces, moments, accelerations and strains in skin (111).

Figure 4:
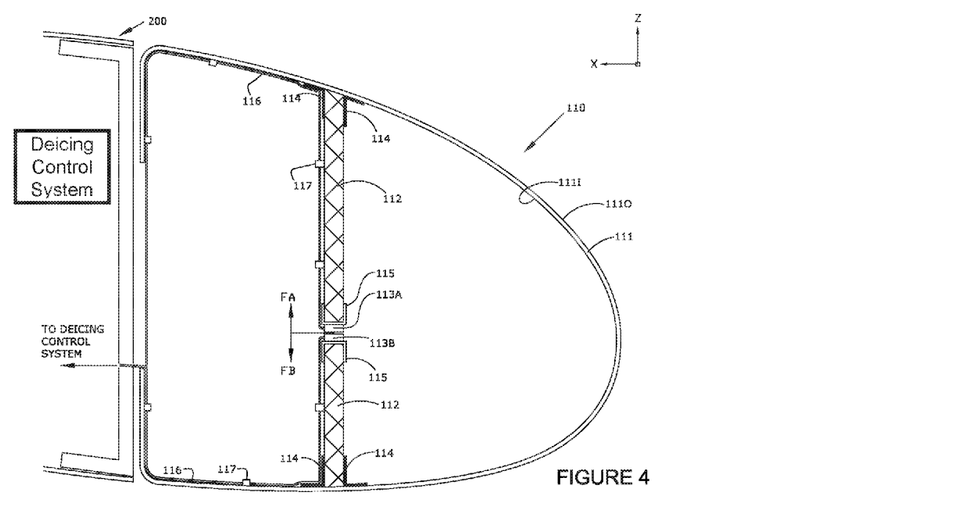
FIG. 4 is an enlarged partially schematic, profile illustration of a portion of an airfoil comprising an EEDS and a modular leading edge in accordance with a further embodiment of the disclosure.

FIG. 4 is an enlarged partially schematic, profile illustration of a portion of an airfoil comprising an EEDS and a modular leading edge in accordance with a further embodiment of the disclosure. Conductor (113A) can be coupled with a first standoff (112) and actuator (113B) can be coupled with a second standoff (112). Actuator forces (FA) and (FB) can be communicated with skin (111) through standoffs (112), resulting in forces and moments being communicated to skin (111). Ice breaking accelerations and strains can occur when actuator forces (FA) and (FB) are communicated with skin (111). In FIG. 4, force (FA), is illustrated aligned with standoff (112). The embodiment illustrated in FIG. 4 could produce large skin accelerations as well as a very loud actuation noise. An embodiment of a routing of connection wires (116) is also illustrated. Connection wires (116) can be held in place with wire brackets (117). Accelerations resulting from actuation can exceed 5,000 G's. Securing connection wires (116) is a necessity if a design is to operate more than a few actuation cycles. For example, a one inch length of 10 AWG wire weights approximately 1.2 gms. The 1.2 gm length of wire, experiencing 5,000 G's would require a 5,000*1.2 gm=6,000 gm or (13.2 lbs) of force to hold a one inch length of wire in place. If the wire is unrestrained, as disclosed in the prior art, low cycle failure of the system is a virtual certainty.

Figure 5:
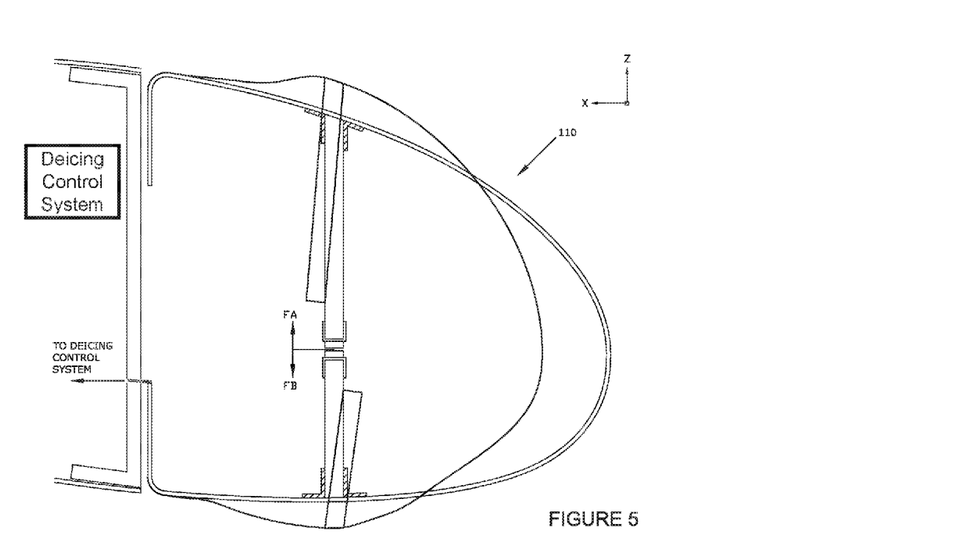
FIG. 5 is a potential deformation occurring at an instant in time subsequent to the application of actuation forces (FA) and (FB) in accordance with a further embodiment of the disclosure.

FIG. 5 is a potential deformation occurring at an instant in time subsequent to application of actuation forces (FA) and (FB) in accordance with a further embodiment of the disclosure. Application of force (FA) can result in upper skin (111) to move generally upward. Actuator force (FB) can result in lower skin (111) to move generally downward.

Figure 6:
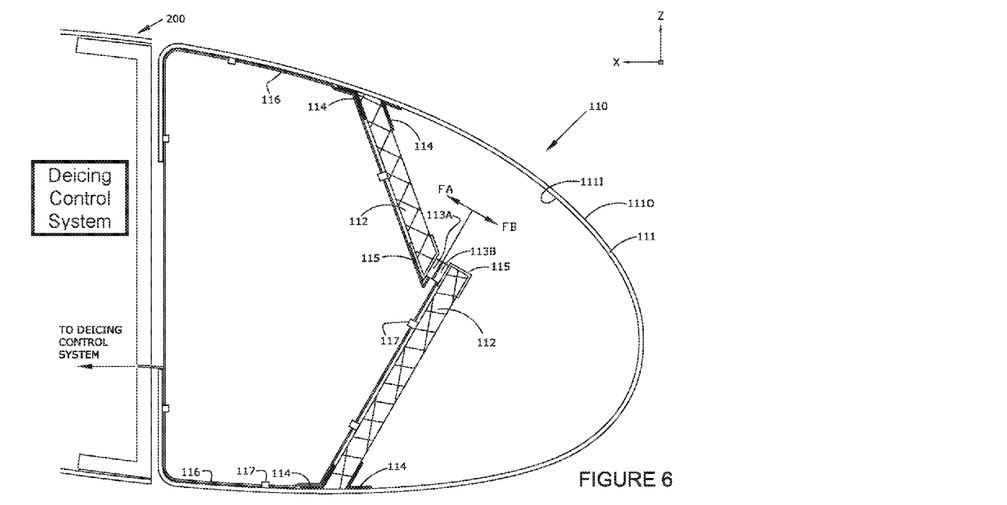
FIG. 6 is an enlarged partially schematic, profile illustration of a portion of an airfoil comprising an EEDS and a modular leading edge comprising two standoffs and actuators in accordance with a further embodiment of the disclosure.

FIG. 6 is an enlarged partially schematic, profile illustration of a portion of an airfoil comprising an EEDS and a modular leading edge comprising two standoffs and an actuator in accordance with a further embodiment of the disclosure. This embodiment discloses conductor (113A) coupled with a first end of first standoff (112) and conductor (113B) coupled with a first end of second standoff (112). Actuator forces (FA) and (FB) can impart forces, moments to skin (111) creating accelerations and strains in skin (111). In this embodiment, actuator forces (FA) and (FB) are not aligned with standoffs (112), which can result in lower actuation noise.

Figure 7:
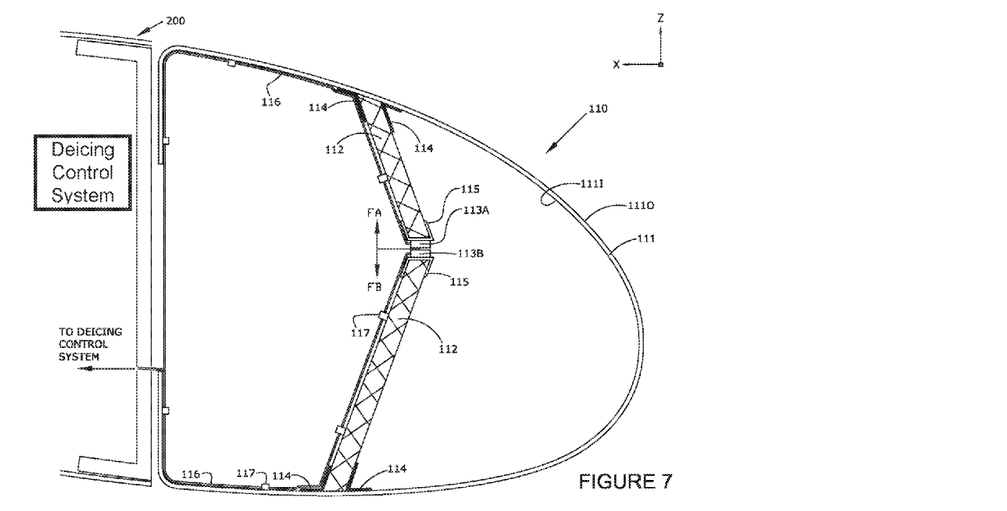
FIG. 7 is an enlarged partially schematic, profile illustration of a portion of an airfoil comprising an EEDS and modular leading edge comprising two standoffs and actuators in accordance with a further embodiment of the disclosure.

FIG. 7 is an enlarged partially schematic, profile illustration of a portion of an airfoil comprising an EEDS and modular leading edge comprising two standoffs and actuators in accordance with a further embodiment of the disclosure. This embodiment is similar to FIG. 7, however actuator forces are more closely aligned with standoffs (112) which could create a louder actuation noise than the noise produced by the potential embodiment depicted in FIG. 6.

Figure 8:
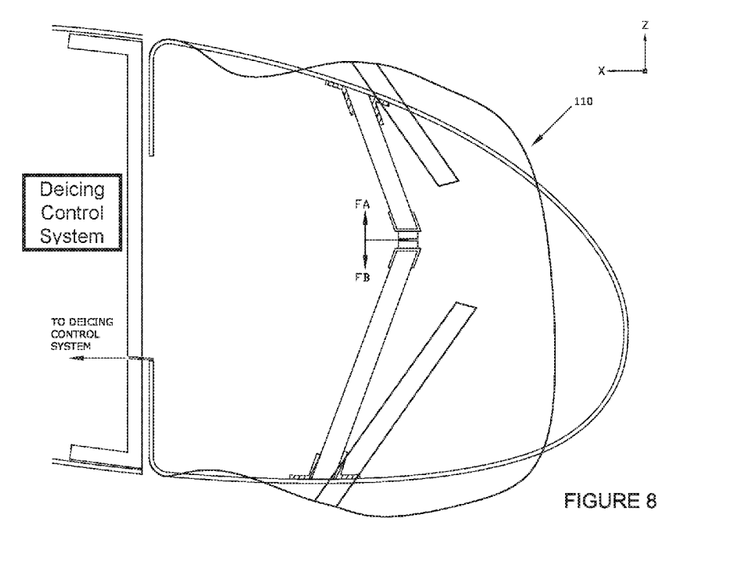
FIG. 8 is a potential deformation occurring at an instant in time subsequent to an application of actuation forces (FA) and (FB) in accordance with a further embodiment of the disclosure.

FIG. 8 is a potential deformation occurring at an instant in time subsequent to an application of actuation forces (FA) and (FB) in accordance with a further embodiment of the disclosure. Upper Skin (111) coupled with an upper standoff is moving up and bending. Lower skin (111) coupled with a lower standoff is moving down and bending.

Figure 9:
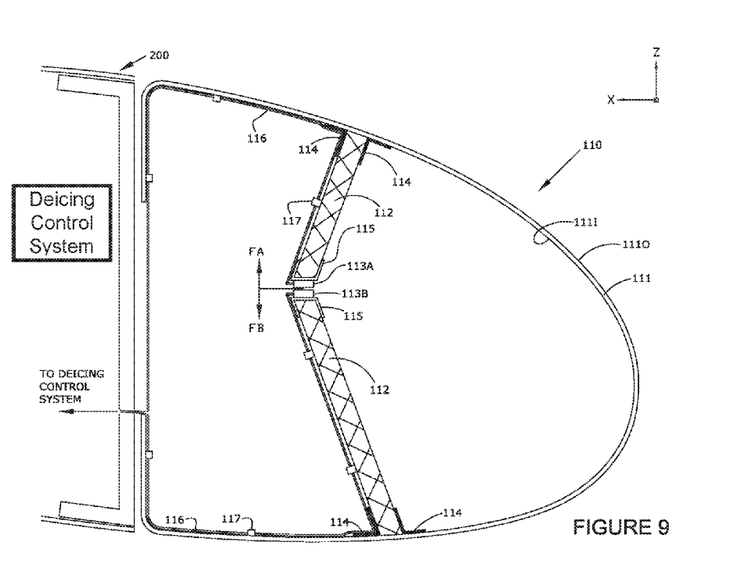
FIG. 9 is an enlarged partially schematic, profile illustration of a portion of an airfoil comprising an EEDS and a modular leading edge comprising two standoffs and actuators in accordance with a further embodiment of the disclosure.

FIG. 9 is an enlarged partially schematic, profile illustration of a portion of an airfoil comprising an EEDS and a modular leading edge comprising two standoffs and actuators in accordance with a further embodiment of the disclosure. This embodiment illustrates an upper standoff (112) being shorter than a lower standoff (112). Other embodiments exist wherein an upper standoff (112) is longer than or equal in length to a lower standoff (112). In this embodiment, a coupling of standoffs (112) with skin (111) comprises angle brackets (114). Additionally, assembly of EEDS components can be made without comprising blind bonds. Assembly steps of components illustrated in FIG. 9 could include bonding of forward angle brackets (114) to skin (111). Subsequent to bonding of forward angle brackets, standoffs (112) can be bonded with skin (111) and angle brackets (114). Then aft angle brackets (14) can be bonded to skin (111) and standoffs (112). The preceding steps can result in accurate positioning of conductor (113A) proximate with (113B) and high quality bonds. Standoffs (114) can be coupled with skin (111) by adhesive bonding, mechanical fasteners as well as any other method known to those skilled in the art.

Figure 10:
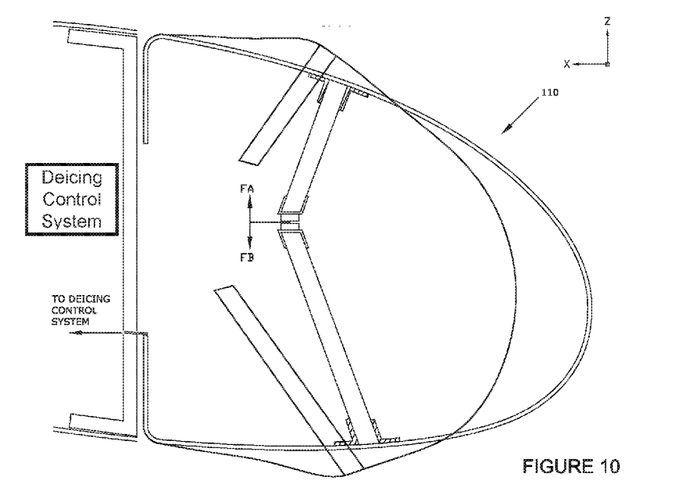
FIG. 10 is a potential deformation occurring at an instant in time subsequent to an application of actuation forces (FA) and (FB) in accordance with a further embodiment of the disclosure.

FIG. 10 is a potential deformation occurring at an instant in time subsequent to the application of actuation forces (FA) and (FB) in accordance with a further embodiment of the disclosure. Upper skin (111) coupled with an upper standoff is moving up and bending. Lower skin (111) coupled with a lower standoff is moving down and bending.

Figure 11:
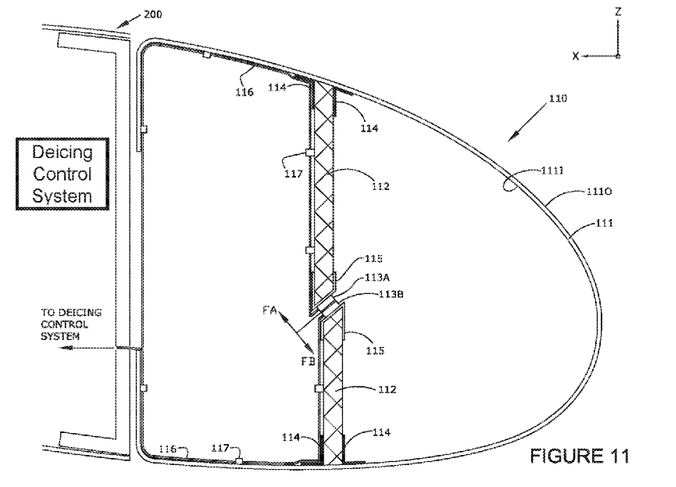
FIG. 11 is an enlarged partially schematic, profile illustration of a portion of an airfoil comprising an EEDS and a modular leading edge comprising two standoffs and actuators in accordance with a further embodiment of the disclosure.

FIG. 11 is an enlarged partially schematic, profile illustration of a portion of an airfoil comprising an EEDS and a modular leading edge comprising two standoffs and actuators in accordance with a further embodiment of the disclosure. Actuator force (FA) and (FB) are not aligned with standoffs (112) and an actuation noise produced by this configuration could be softer than an actuation noise produced by a configuration similar to that illustrated in FIG. 4. Lower standoff (112) can be parallel with but not coplanar with an upper standoff (112). An offset standoff (112) can, in some implementations, produce greater ice shedding.

Figure 12:
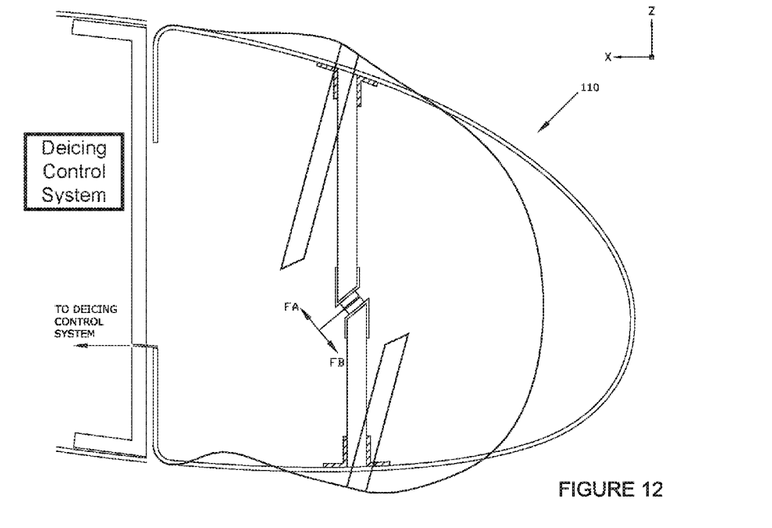
FIG. 12 is a potential deformation occurring at an instant in time subsequent to an application of actuation forces (FA) and (FB) in accordance with a further embodiment of the disclosure.

FIG. 12 is a potential deformation occurring at an instant in time subsequent to the application of actuation forces (FA) and (FB) in accordance with a further embodiment of the disclosure. Upper skin (111) coupled with an upper standoff is moving up and bending. Lower skin (111) coupled with a lower standoff is moving down and bending.

Figure 13:
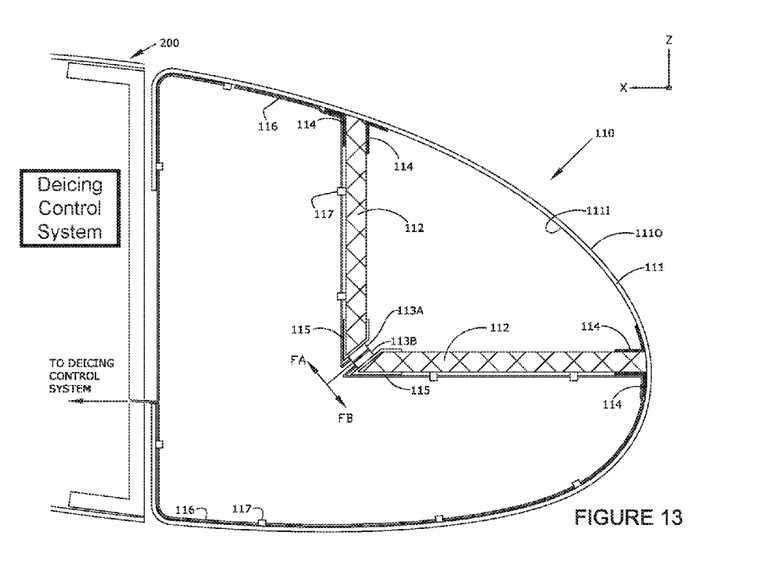
FIG. 13 is an enlarged partially schematic, profile illustration of a portion of an airfoil comprising an EEDS and a modular leading edge comprising two standoffs and actuators in accordance with a further embodiment of the disclosure.

FIG. 13 is an enlarged partially schematic, profile illustration of a portion of an airfoil comprising an EEDS and a modular leading edge comprising two standoffs and actuators in accordance with a further embodiment of the disclosure. Actuator forces (FA) and (FB) are not aligned with standoffs (112). Actuator force (FB) can be communicated to skin (111) through forward standoff (112), communicating forces, moments to skin (111), creating accelerations and strains in skin (111).

Figure 14:
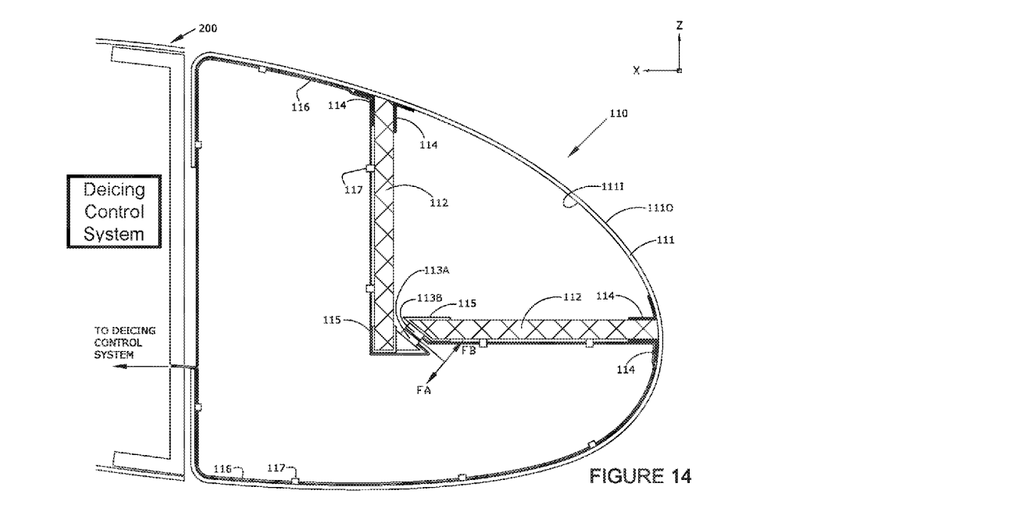
FIG. 14 is an enlarged partially schematic, profile illustration of a portion of an airfoil comprising an EEDS and a modular leading edge comprising two standoffs and actuators in accordance with a further embodiment of the disclosure.

FIG. 14 is an enlarged partially schematic, profile illustration of a portion of an airfoil comprising an EEDS and a modular leading edge comprising two standoffs and actuators in accordance with a further embodiment of the disclosure. In this embodiment, actuator force (FA) can be oriented such that skin (111) moves down in a region where vertical standoff (112) is coupled with skin (111). Actuator force (FB) can impart forces and moments in skin (111) near a 0% chord region.

Figure 15:
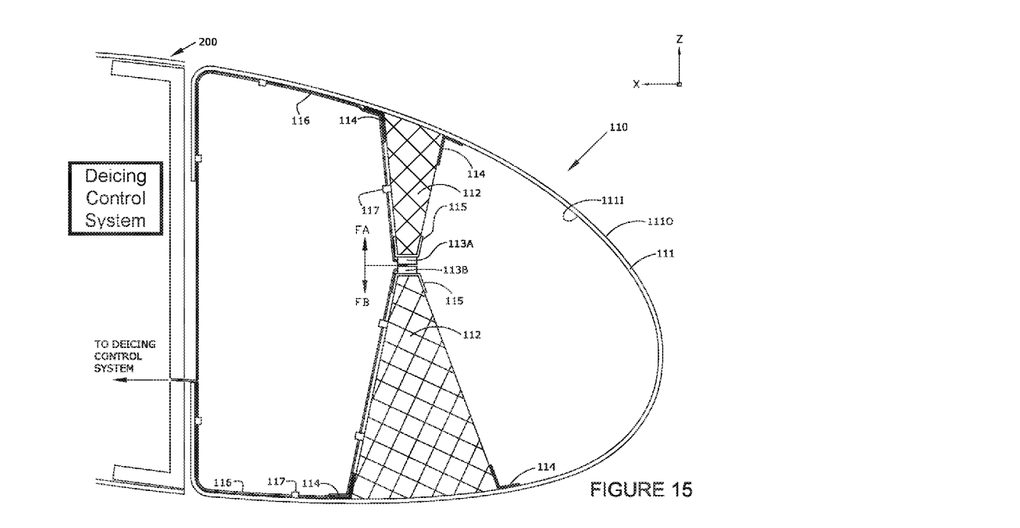
FIG. 15 is an enlarged partially schematic, profile illustration of a portion of an airfoil comprising an EEDS and a modular leading edge comprising two standoffs and actuators in accordance with a further embodiment of the disclosure.

FIG. 15 is an enlarged partially schematic, profile illustration of a portion of an airfoil comprising an EEDS and a modular leading edge comprising two standoffs and actuators in accordance with a further embodiment of the disclosure. Standoffs (112) can comprise many cross sectional geometries. In this embodiment, they are illustrated as somewhat trapezoidal. Standoffs (112) which comprise a wide coupling surface with skin (111) can spread actuator force (FA) and (FB) over a larger surface area. A wide standoff base also can reduce localized skin bending.

Figure 16:
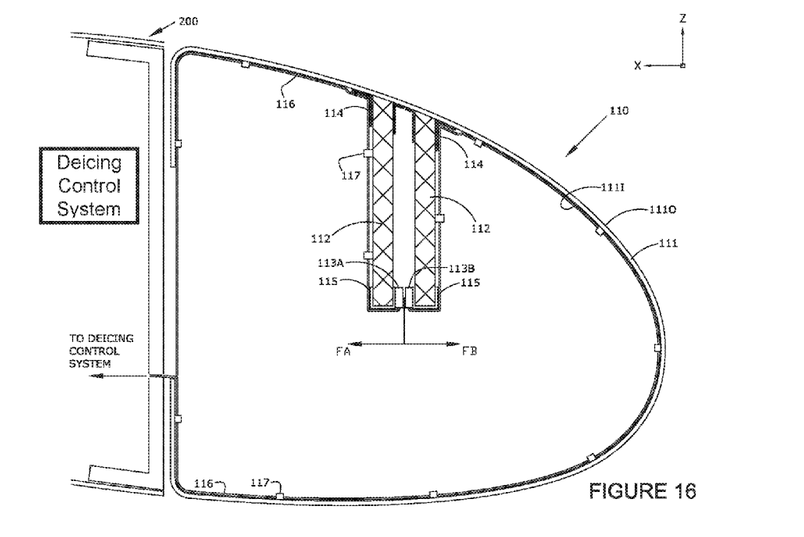
FIG. 16 is an enlarged partially schematic, profile illustration of a portion of an airfoil comprising an EEDS and a modular leading edge comprising two standoffs and actuators in accordance with a further embodiment of the disclosure.

FIG. 16 is an enlarged partially schematic, profile illustration of a portion of an airfoil comprising an EEDS and a modular leading edge comprising two standoffs and actuators in accordance with a further embodiment of the disclosure. Two standoffs (112) can be coupled with skin (111) proximate to each other. Conductors (113A) and (113B) can be coupled with standoffs (112). Actuator forces (FA) and (FB) can be applied to sides of standoffs (112) and communicate forces and moments to skin (111). An embodiment similar to that illustrated in FIG. 16 can also be utilized on a flat panel or on a large airfoil such as a windmill blade.

Figure 17:
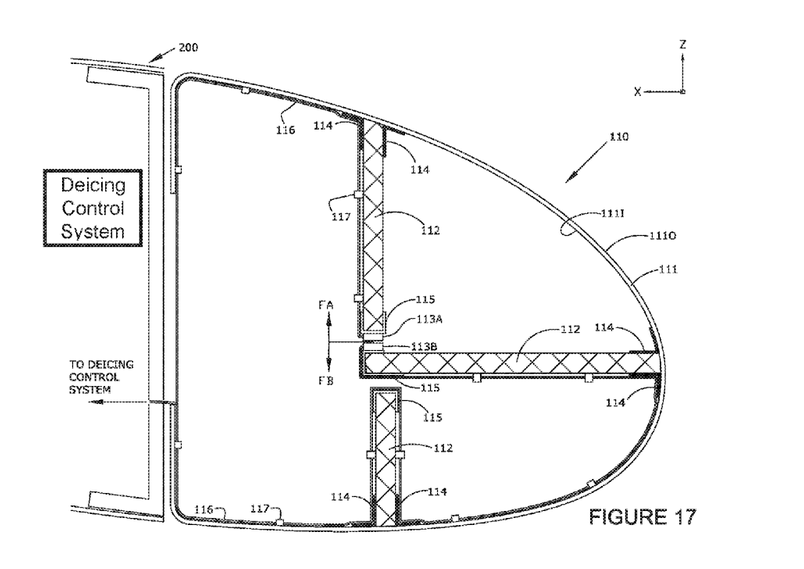
FIG. 17 is an enlarged partially schematic, profile illustration of a portion of an airfoil comprising an EEDS and a modular leading edge comprising three standoffs and two actuators in accordance with a further embodiment of the disclosure.

FIG. 17 is an enlarged partially schematic, profile illustration of a portion of an airfoil comprising an EEDS and a modular leading edge comprising three standoffs and an actuator in accordance with a further embodiment of the disclosure. Forward standoff (112) is illustrated coupled with skin (111) near the 0% chord. Actuator force (FB) can be applied to forward standoff first end and can be oriented perpendicular to forward standoff (112). Actuation force (FB) can be communicated to skin (111) through forward standoff (111). Forward standoff first end can translate and can contact lower standoff (112). An impact between forward standoff (112) and lower standoff (112) can be communicated to skin (111) communicating forces, moments to skin (111), creating accelerations and strains in skin (111).

Figure 18:
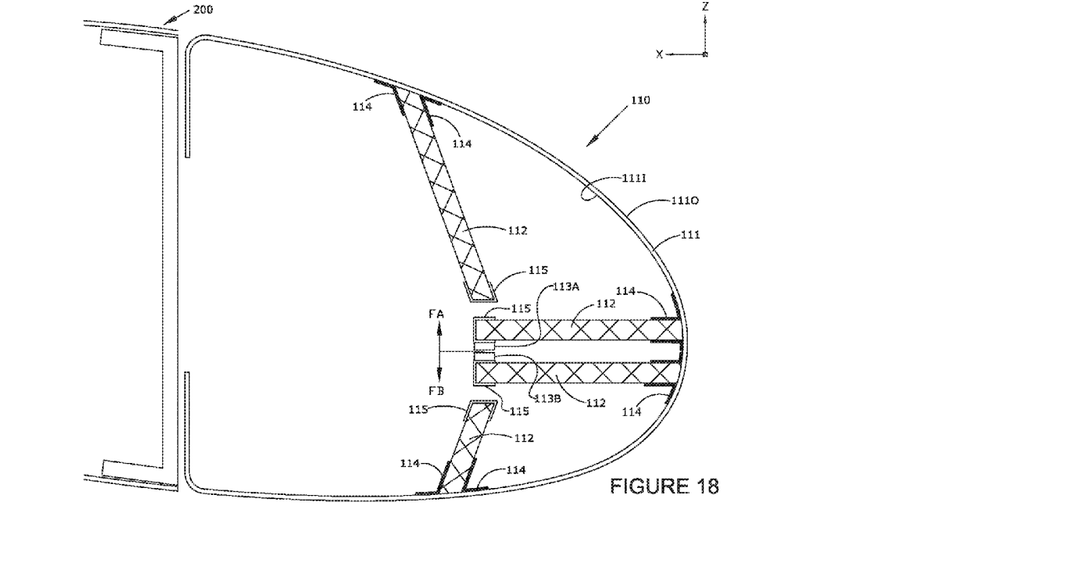
FIG. 18 is an enlarged partially schematic, profile illustration of a portion of an airfoil comprising an EEDS and a modular leading edge comprising four standoffs and two actuators in accordance with a further embodiment of the disclosure.

FIG. 18 is an enlarged partially schematic, profile illustration of a portion of an airfoil comprising an EEDS and a modular leading edge comprising four standoffs and an actuator in accordance with a further embodiment of the disclosure. This embodiment illustrates two forward standoffs (112) coupled with skin (111) near a 0% chord region. A conductor is coupled with both forward standoffs (112). Actuator forces can be imparted on first ends of forward standoffs (112). Actuator force (FA) can be imparted to first end of upper forward standoff causing first end of forward standoff to move upward. Actuator force (FB) can be imparted to first end of lower forward standoff causing first end of lower forward standoff to move downward. Said first ends of forward standoffs can impact other standoffs. A first end of upper forward standoff can contact an upper standoff causing an impact. An impact at one end of an upper standoff can be communicated to skin (111) and can create, forces, moments, accelerations and strains in skin (111). A first end of lower forward standoff can contact a lower standoff, causing an impact. An impact at one end of a lower standoff can be communicated to skin (111) and can impart forces, moments to skin (111) creating accelerations and strains in skin (111).

Figure 19:
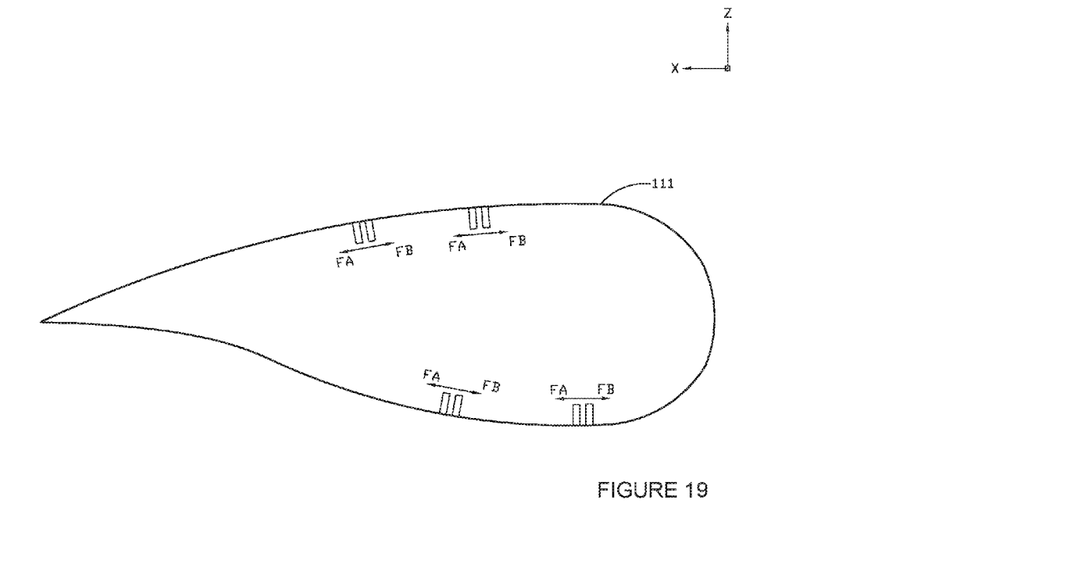
FIG. 19 is a partially schematic, profile illustration of a portion of an airfoil comprising an EEDS and a modular leading edge comprising eight standoffs and four actuators in accordance with a further embodiment of the disclosure.

FIG. 19 is a partially schematic, profile illustration of a portion of an airfoil comprising an EEDS and a modular leading edge comprising eight standoffs and four actuators in accordance with a further embodiment of the disclosure. An embodiment similar to that illustrated in FIG. 19 could be utilized to de-ice an expansive surface such as a windmill blades. Pairs of standoffs could be position along a surface communicating forces, moments to skin (111) creating accelerations and strains in skin (111), de-icing a surface.

Figure 20:
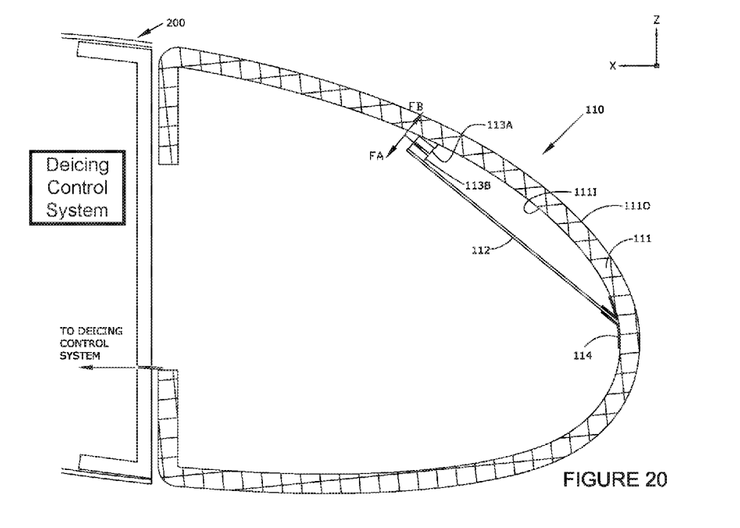
FIG. 20 is an enlarged partially schematic, profile illustration of a portion of an airfoil comprising an EEDS and a modular leading edge comprising two standoffs and two actuators in accordance with a further embodiment of the disclosure.

FIG. 20 is an enlarged partially schematic, profile illustration of a portion of an airfoil comprising an EEDS and a modular leading edge comprising a standoff (112) and an actuator. In this embodiment the actuator is comprised of conductors (113A) and (113B). Standoff (112) can be manufactured from a thin laminate, sheet metal or other thin material known to those skilled in the art. In some embodiments, skin (111) can be manufactured from a honeycomb sandwich panel. In some embodiments it may be desirous to have large standoff bending and minimal skin bending. For example, bending a face sheet of a honeycomb sandwich panel may cause failure of a bond between a face sheet and a core. A de-icing design could allow a standoff to bend and then slap back down communicating an impact to skin (111). The impact to skin (111) can create accelerations and strains, de-icing skin (111). Skin (111) can also be filled with "core-fill" or similar to locally stabilize a skin (111).

Figure 21:
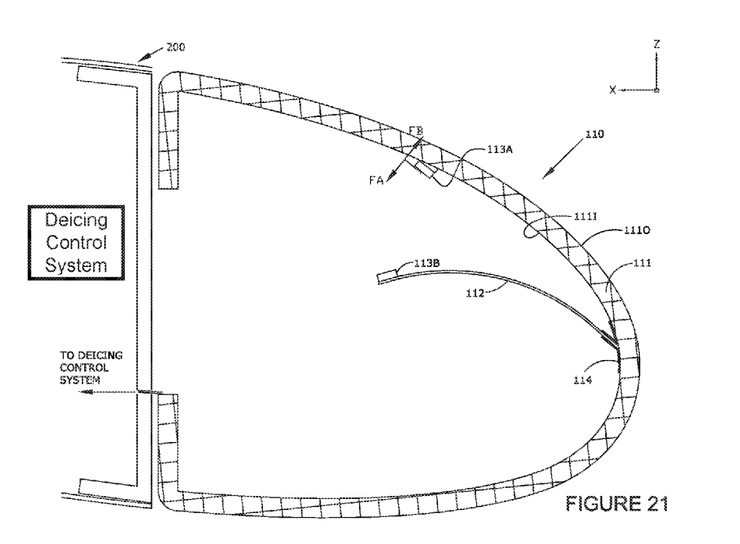
FIG. 21 is a potential deformation occurring at an instant in time subsequent to the application of actuation forces (FA) and (FB) in accordance with a further embodiment of the disclosure.

FIG. 21 is a potential deformation occurring at an instant in time subsequent to the application of actuation forces (FA) and (FB) in accordance with a further embodiment of the disclosure. Subsequent to an application of an actuation force, standoff (112) can bend as illustrated in FIG. 21. Subsequent to this instant in time, standoff (112) can then slap back, imparting an impact to skin (111).

From the foregoing, it will be appreciated that specific embodiments have been described herein for purposes of illustration, but that the invention may include other embodiments as well. For example, features described above with reference to embodiments comprising one standoff can be applied to EEDS designs comprising more than one standoff. In addition, actuator coupling with standoffs can have arrangements other than those specifically shown in the Figures. Certain aspects of the disclosure described in the context of particular embodiments may be combined or eliminated in other embodiments. Further, while advantages associated with certain embodiments have been described in the context of those embodiments, other embodiments may also exhibit such advantages, and not all embodiments need necessarily exhibit such advantages to fall within the scope of the disclosure. Accordingly, the invention can include other embodiments not explicitly shown or described above. Therefore, the invention is not limited, except as by the appended claims.

I claim:

1. An aircraft leading edge electro-expulsive deicing apparatus comprising:
   a leading edge comprising a skin;
      said skin comprising first and second regions;
   a first standoff coupled with said first region;
   an actuator comprising:
      electrical conductors;
         wherein at least one first conductor is coupled with said first standoff;
         wherein at least one second conductor is coupled with said skin second region;
   a second standoff interposed between and coupling said at least one second conductor and said skin second region;
      wherein said at least one first and second conductors are positioned proximate to each other;
      wherein said at least one first and second conductors are electrically coupled with a deicing control system; and
   a third standoff proximate to said first standoff and coupled to a skin third region;
      said third standoff being configured to receive an impact from said first standoff and to communicate said impact from said first standoff to a skin third region.

2. The aircraft leading edge electro-expulsive deicing apparatus of claim 1, further comprising:
   a fourth standoff proximate to said second standoff and coupled to a skin fourth region;
      said fourth standoff being configured to receive an impact from said second standoff and to communicate said impact from said second standoff to said skin fourth region.

3. A method of deicing an aircraft leading edge comprising:
   providing an aircraft leading edge electro-expulsive deicing apparatus comprising:
      a leading edge comprising a skin;
         said skin comprising first and second regions;
      a first standoff coupled with said first region;
      an actuator comprising:
         electrical conductors;
            wherein at least one first conductor is coupled with said first standoff;
            wherein at least one second conductor is coupled with said second region;
      a second standoff interposed between and coupling said at least one second conductor and said skin second region;
         wherein said at least one first and second conductors are positioned proximate to each other;

wherein said at least one first and second conductors are electrically coupled with a deicing control system; and a third standoff proximate to said first standoff and coupled to a skin third region;

said third standoff being configured to receive an impact from said first standoff and to communicate said impact from said first standoff to a skin third region;

creating forces on said at least one first and second conductors by passing current pulses through said at least one first and second conductors; and communicating said forces on said at least one first and second conductors to said skin first, second and third regions to deice said surface.

4. The method of deicing an aircraft leading edge of claim 3, further comprising:

providing a fourth standoff proximate to said second standoff and coupled to a skin fourth region;

said fourth standoff being configured to receive an impact from said second standoff and to communicate said impact to a skin fourth region; and wherein the step of communicating said forces on said at least one first and second conductors includes communicating said forces to said skin fourth region.

5. An electro-expulsive apparatus comprising:

an object comprising a surface;

said surface comprising first and second regions;

a first standoff coupled with said first region;

an actuator comprising:

electrical conductors;

wherein at least one first conductor is coupled with said first standoff;

wherein at least one second conductor is coupled with said second region;

a second standoff interposed between and coupling said at least one second conductor and said skin second region;

wherein said at least one first and second conductors are positioned proximate to each other;

wherein said at least one first and second conductors are electrically coupled with a deicing control system; and a third standoff positioned proximate to said first standoff and coupled to a surface third region; and said third standoff being configured to receive an impact from said first standoff and to communicate said impact from said first standoff to the surface third region; and wherein said deicing control system is configured to pass current pulses through said at least one first and second conductors, thereby creating forces in said at least one first and second conductors to shed ice from the surface of the object.

* * * * *